United States Patent
Xu et al.

(10) Patent No.: US 10,959,209 B2
(45) Date of Patent: Mar. 23, 2021

(54) COMMUNICATION RESOURCE SELECTION METHOD AND DEVICE

(71) Applicant: ZTE CORPORATION, Shenzhen (CN)

(72) Inventors: Hui Xu, Shenzhen (CN); Fang Xie, Shenzhen (CN); Chen Lu, Shenzhen (CN); Yong Lv, Shenzhen (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/346,484

(22) PCT Filed: Nov. 3, 2017

(86) PCT No.: PCT/CN2017/109259
§ 371 (c)(1),
(2) Date: Apr. 30, 2019

(87) PCT Pub. No.: WO2018/082645
PCT Pub. Date: May 11, 2018

(65) Prior Publication Data
US 2020/0059896 A1    Feb. 20, 2020

(30) Foreign Application Priority Data
Nov. 3, 2016   (CN) .......................... 201610959023.4

(51) Int. Cl.
*H04W 72/02* (2009.01)
*H04W 72/04* (2009.01)
*H04W 92/18* (2009.01)

(52) U.S. Cl.
CPC ......... *H04W 72/02* (2013.01); *H04W 72/044* (2013.01); *H04W 92/18* (2013.01)

(58) Field of Classification Search
CPC ... H04W 72/02; H04W 72/044; H04W 92/18; H04W 36/30; H04W 72/085; H04W 72/1289; H04W 72/0446
See application file for complete search history.

(56) References Cited

U.S. PATENT DOCUMENTS

2017/0034865 A1*  2/2017  Jung ..................... H04W 76/18
2017/0188403 A1*  6/2017  Jung ..................... H04W 76/27
(Continued)

FOREIGN PATENT DOCUMENTS

CN        104410975 A       3/2015
CN        104540236 A       4/2015
(Continued)

OTHER PUBLICATIONS

International Search Report dated Feb. 6, 2018 for International Application No. PCT/CN2017/109259, 5 pages.
(Continued)

*Primary Examiner* — Benjamin H Elliott, IV
(74) *Attorney, Agent, or Firm* — Knobbe Martens Olson & Bear LLP (57) ABSTRACT

A communication resource selection method includes: obtaining communication resource selection indication information; and determining a selection manner based on the communication resource selection indication information, and selecting a communication resource in an exceptional resource pool according to the determined selection manner. Also provided is a communication resource selection device.

15 Claims, 6 Drawing Sheets

```
┌─────────────────────────────────────────────────────────┐
│                                                         │  301
│   Obtain communication resource selection indication    │
│                     information                         │
│                                                         │
└─────────────────────────┬───────────────────────────────┘
                          │
                          ▼
┌─────────────────────────────────────────────────────────┐
│   Determine an exceptional resource pool and a selection│  302
│   manner based on the communication resource selection  │
│  indication information, and select a communication     │
│  resource in the exceptional resource pool according    │
│               to the determined selection manner        │
└─────────────────────────────────────────────────────────┘
```

(56) References Cited

U.S. PATENT DOCUMENTS

| | | | |
|---|---|---|---|
| 2017/0188408 A1* | 6/2017 | Jung | H04W 76/14 |
| 2017/0245248 A1* | 8/2017 | Lei | H04W 76/14 |
| 2018/0020387 A1* | 1/2018 | Van Der Velde | H04W 74/02 |
| 2019/0222983 A1* | 7/2019 | Adachi | H04W 76/27 |
| 2020/0059896 A1* | 2/2020 | Xu | H04W 72/044 |

FOREIGN PATENT DOCUMENTS

| | | | |
|---|---|---|---|
| GB | 2552319 | * | 1/2018 |
| GB | 2552554 | * | 1/2018 |
| WO | 2015163714 A | | 10/2015 |

OTHER PUBLICATIONS

Written Opinion of the International Searching Authority dated Feb. 6, 2018 for International Application No. PCT/CN2017/109259, 3 pages.

LG Electronics, Inc., "Addition of UE Geographical Information Reporting", 3GPP TSG-RAN2 Meeting #95bis R2-167011, Oct. 14, 2016, section 23.14.1.1.

* cited by examiner

COMMUNICATION RESOURCE SELECTION METHOD AND DEVICE

CROSS REFERENCE TO RELATED APPLICATIONS

This is a National Stage Application, filed under 35 U.S.C. 371, of International Patent Application No. PCT/CN2017/112896, filed on Nov. 24, 2017, which claims priorities to Chinese patent application No. 201710011183.0, filed on Jan. 6, 2017, contents of which are incorporated herein by reference in its entirety.

TECHNICAL FIELD

The present disclosure relates to the field of communications, and for example, relates to a communication resource selection method and device.

BACKGROUND

With the development of mobile communication technologies, the Long Term Evolution (LTE) technology has been applied in the interactive network communications. When a user equipment (UE) selects a resource in an exceptional resource pool, a resource conflict may be caused if a random selection manner is used to select the resource, and a second of sensing time may not meet a delay demand of a service of the interactive network communications if a sensing manner is used to select the resource.

SUMMARY

A communication resource selection method includes: obtaining communication resource selection indication information; and determining an exceptional resource pool and a selection manner based on the communication resource selection indication information, and selecting a communication resource in the exceptional resource pool according to the determined selection manner.

A user equipment includes: at least one processor; and a memory which is in a communication connection with the at least one processor; the memory stores instructions executable by the at least one processor that executes the instructions to execute the method described above.

A base station includes: at least one processor; and a memory which is in a communication connection with the at least one processor; the memory stores instructions executable by the at least one processor that executes the instructions to execute any one of methods described below.

A communication resource selection method includes: determining an exceptional resource pool and a selection manner, where the selection manner is a manner of selecting a communication resource from the exceptional resource pool; and transmitting communication resource selection indication information carrying the exceptional resource pool and the selection manner to a user equipment (UE).

A communication resource selection device includes: an obtaining unit, which is configured to obtain communication resource selection indication information; and a processing unit, which is configured to determine an exceptional resource pool and a selection manner based on the communication resource selection indication information, and select a communication resource in the exceptional resource pool according to the determined selection manner.

A communication resource selection device includes a determining unit and a transmitting unit. The determining unit is configured to determine an exceptional resource pool and a selection manner, and the selection manner is a manner of selecting a communication resource from the exceptional resource pool. The transmitting unit is configured to transmit communication resource selection indication information carrying the exceptional resource pool and the selection manner to a UE.

A computer-readable storage medium is configured to store computer-executable instructions for executing the methods described above.

DETAILED DESCRIPTION

Using a Vehicle-to-Everything (V2X) application in interactive network communications as an example, situations where a user equipment (UE) selects a communication resource are described.

Figure 1:
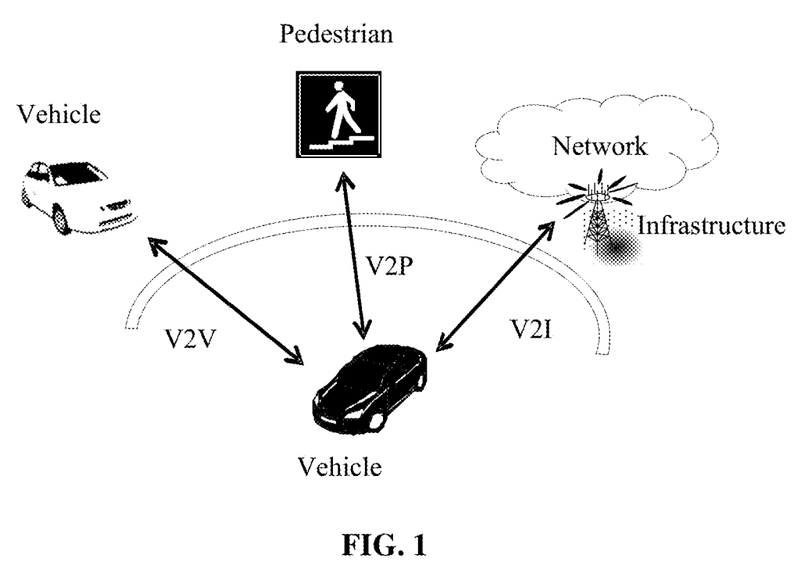
FIG. 1 is a schematic diagram of a Vehicle-to-Everything (V2X)

FIG. 1 is a schematic diagram of a Vehicle-to-Everything (V2X). As shown in FIG. 1, the V2X refers to providing vehicle information through sensors, vehicle-mounted terminals and electronic tags mounted on vehicles, implementing Vehicle-to-Vehicle (V2V), Vehicle-to-Pedestrian (V2P) and Vehicle-to-Infrastructure (V2I) intercommunication by using at least one of communication technologies. An information network platform may be used for extracting and sharing information, managing and controlling vehicles, and providing vehicles with comprehensive services.

The V2X technology based on the long-term evolution (LTE) discussed in the 3rd generation partnership project (3GPP) includes that a road side unit (RSU) may be implemented through a still UE or an evolved Node B (eNB) and that the V2V, the V2I, or the V2P may be implemented through a PC5 interface or a Uu interface. The PC5 interface refers to an air interface of device-to-device (D2D), and the Uu interface refers to an air interface from the UE to the eNB.

Figure 2:
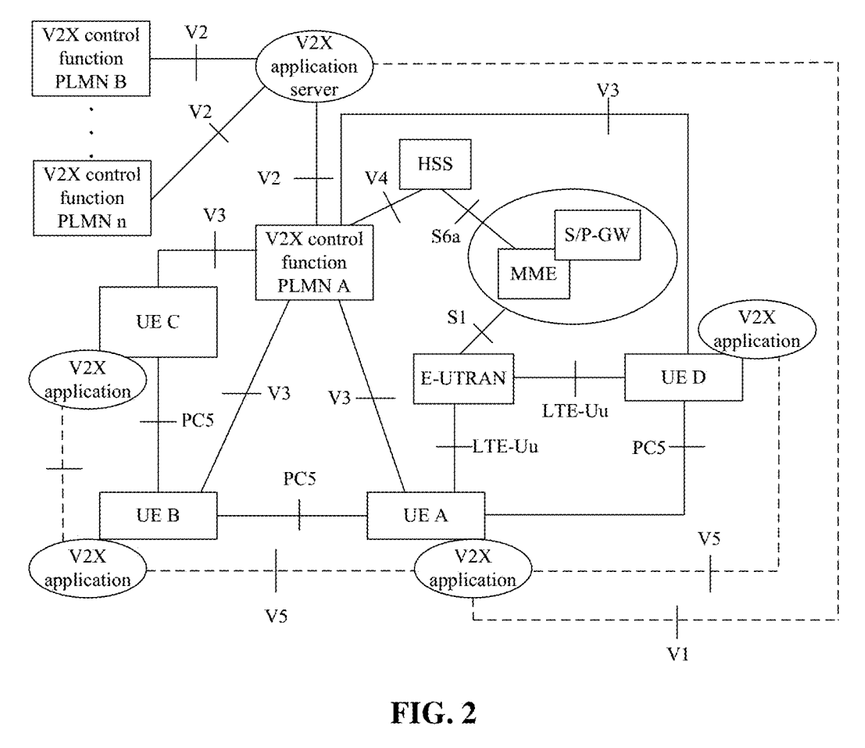
FIG. 2 is a schematic diagram of an architecture for transmitting a V2X service thorough a PC5 interface.

A system for transmitting a V2X service thorough a PC5 interface is as shown in FIG. 2. In the LTE V2X project researched by the 3GPP, during resource scheduling the LTE V2X has two resource scheduling modes of a Mode 3 and a Mode 4, i.e., a base station scheduling mode (the Mode 3) and an automatous selection mode (the Mode 4). In the automatous selection resource mode (the Mode 4), the UE selects a required PC5 interface in a sensing manner and transmits resources through the selected PC5 interface. When a cell handover (HO), a radio link failure (RLF), or a resource pool changing, etc., occurs, the UE may use an exceptional resource pool. A pedestrian-UE (P-UE) device in the V2P usually has no capability of transmitting the resource through the PC5 interface. That is, the P-UE may not select the resource in the sensing manner.

Figure 3:
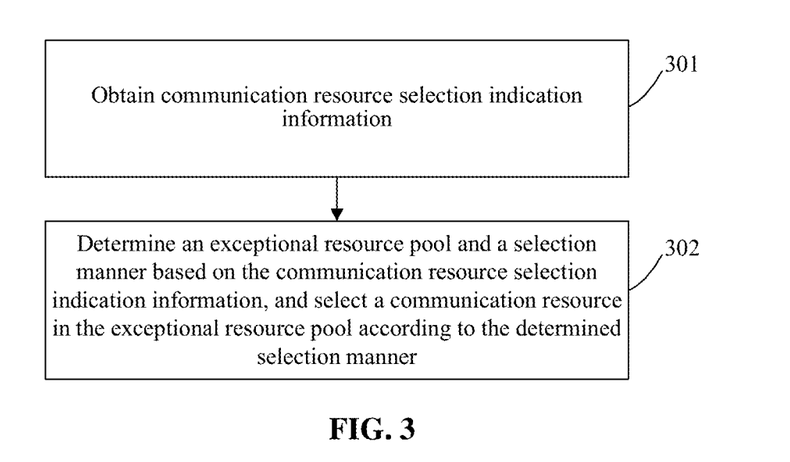
FIG. 3 is a flowchart of a resource selection method according to an embodiment.

FIG. 3 is a flowchart of a resource selection method according to an embodiment. The method may be applied in a terminal (such as a UE). As shown in FIG. 3, the resource selection method includes steps described below.

In step 301, communication resource selection indication information is obtained.

The communication resource selection indication information is indication information for indicating that the terminal selects the communication resource from the exceptional resource pool by using one selection manner.

The communication resource may be a PC5 interface communication resource. The PC5 refers to an interface between UEs, or may be represented by other terms (such as a sidelink). The PC5 interface may use a licensed frequency spectrum technology, or may use wireless local area networks (WLAN), wireless fidelity (WiFi, such as the 802.11 family), Bluetooth or an infrared wireless transmission technology, etc., to transmit and receive data.

The communication resource may be a resource for user communication, and the PC5 interface communication resource may be a resource transmitted by the PC5 interface of the user.

The D2D communications may be implemented in a scheduling assignment (SA) manner. That is, a resource position of indication data is acquired in the SA, and the data is transmitted in the corresponding position. In order to correctly transmit and receive the data in the D2D communications, an SA key, the SA and the data transmitted in the corresponding position may use frequency division multiplexing (such as the same subframe) or time division multiplexing (such as different subframes). The PC5 interface communications includes same frequency or differ-frequency. The same frequency refers to that the Uu interface and the PC5 interface use the same frequency, and the differ-frequency refers to that the PC5 interface uses a frequency which is different from a frequency used by the Uu interface, i.e., the PC5 interface uses a dedicated frequency.

In an embodiment, the step of obtaining the communication resource selection indication information includes: receiving communication resource selection indication information transmitted by a network side.

The network side may include a base station.

In an embodiment, the terminal receives the communication resource selection indication information transmitted by the base station.

Alternatively, the communication resource selection indication information is transmitted by the base station through at least one of: a system broadcast message, a radio resource control (RRC) signaling, a media access control (MAC) signaling, and a physical layer signaling.

The RRC signaling may be an RRC signaling used for dedicatedly transmitting the communication resource selection indication information.

In an embodiment, the step of obtaining the communication resource selection indication information includes: obtaining communication resource selection indication information pre-configured by the network side.

The communication resource selection indication information may be configured by the base station in advance.

In an embodiment, the terminal, after receiving the communication resource selection indication information configured by the base station in advance, stores the communication resource selection indication information into a memory or a universal integrated circuit card (UICC) of the terminal.

The communication resource selection indication information may include an exceptional resource pool and a selection manner.

The selection manner is a manner of selecting the communication resource(s) from the exceptional resource pool.

For example, the exceptional resource pool refers to a resource pool which is used for PC5 interface communications and which may be temporarily used when an exceptional event occurs. The exceptional resource pool may be configured by the eNB (for example, when the UE is in a coverage range of the eNB) or may be pre-configured by the UE. The exceptional resource pool pre-configured by the UE may be stored in the memory or the UICC of the UE.

The exceptional event may include at least one of: a handover (HO), a radio link failure (RLF), and a resource pool update.

In an embodiment, the exceptional resource pool includes: time domain resource information and frequency domain resource information. The time domain resource takes a subframe as a unit. The frequency domain resource takes a resource block (RB) or a sub-channel as a unit, and the sub-channel is multiple continuous RBs. The exceptional resource pool may be used for at least one of a physical sidelink control channel (PSCCH) and a physical sidelink shared channel (PSSCH).

The selection manner may include one of: a random selection manner, a pre-sensing manner, and a partial sensing manner.

Alternatively, the pre-sensing manner is a manner that the UE, when meeting a preset threshold condition (the preset threshold condition is set by the eNB or is pre-configured by the UE), senses resources in the exceptional resource pool and selects the required communication resource(s) according to a sensing result. The preset threshold condition may be a pre-sensing threshold condition met by some parameters of a signal processed by the UE.

The pre-sensing threshold condition includes a pre-sensing threshold. The pre-sensing threshold may be a threshold of a strength of a received signal or a threshold of a strength of a reference signal, such as a sidelink reference signal received power (S-RSRP), a PSSCH reference signal received power (PSSCH-RSRP), and a sidelink received signal strength indicator (S-RSSI).

The partial sensing manner may be a manner that the UE senses a part of communication resources in the exceptional resource pool according to the communication resource selection indication information (which is indicated by the eNB or is pre-configured by the UE), and selects the required PC5 communication resource(s) according to a sensing result. The communication resource selection indication information may include a pre-sensing threshold and a range of resources partially sensed.

The terminal may transmit first service data by using the selected PC5 communication resource(s). The first service data is service data which needs to be transmitted by using the communication resource(s).

Alternatively, the communication resource selection indication information further includes at least one of: a triggering condition of the selection manner; and a condition for stopping selecting the communication resource in the selection manner.

For example, the triggering condition includes at least one of: a pre-sensing threshold, and a range of resources partially sensed.

When the sending manner does not meet a delay requirement, the communication resource may be selected by using a random selection manner.

For example, the condition for stopping selecting the communication resource in the selection manner includes: an exceptional event ending, timeout of a corresponding timer, or a PC5 signal quality exceeding a threshold.

In step 302, an exceptional resource pool and a selection manner are determined based on the communication resource selection indication information, and a communication resource is selected in the exceptional resource pool according to the determined selection manner.

In an embodiment, after the step 302, the method may further include at least one of: transmitting first service data by using the communication resource; and receiving the first service data by using the communication resource.

The communication resource may be an air interface resource between UEs. The exceptional resource pool is a resource pool of communication resources used by the UE to autonomously select the first service data. The exceptional resource pool includes one of: an exceptional resource pool configured by a base station, and a pre-configured exceptional resource pool.

The pre-configured exceptional resource pool may be an exceptional resource pool pre-configured in the UE.

In an embodiment, the step of determining the exceptional resource pool and the selection manner based on the communication resource selection indication information, and selecting the communication resource in the exceptional resource pool according to the determined selection manner includes: in response to determining that the selection manner carried in the communication resource selection indication information is the pre-sensing manner, determining whether a triggering condition of pre-sensing is met; in response to meeting the triggering condition of pre-sensing, performing the pre-sensing on the exceptional resource pool, and selecting the communication resource in the exceptional resource pool according to a pre-sensing result; and in response to meeting the condition of pre-sensing and determining that the pre-sensing manner fails to be used, selecting the communication resource in the exceptional resource pool by using a random selection manner.

Alternatively, the determining that the pre-sensing manner fails to be used includes one of: in response to determining that the pre-sensing manner does not meet a delay requirement of a first service, determining that the pre-sensing manner fails to be used; in response to determining that the terminal fails to select a required communication resource in the pre-sensing manner, determining that the pre-sensing manner fails to be used; and in response to determining that the UE does not have a capability of receiving data through an air interface between the UEs, determining that the pre-sensing manner fails to be used.

In an embodiment, the step of performing pre-sensing on the exceptional resource pool, and selecting the communication resource in the exceptional resource pool according to the pre-sensing result includes: when communication resources which do not meet a requirement in the exceptional resource pool are excluded, if remaining communication resources are insufficient, the terminal resets the pre-sensing threshold and re-performs the pre-sensing according to the reset threshold until the remaining communication resources meet the requirement.

In an embodiment, the step of determining the exceptional resource pool and the selection manner based on the communication resource selection indication information, and selecting the communication resource in the exceptional resource pool according to the determined selection manner includes: in response to determining that the selection manner carried in the communication resource selection indication information is the partial sensing manner, determining whether a triggering condition of partial sensing is met; in response to meeting the triggering condition of partial sensing, performing the partial sensing on the exceptional resource pool, and selecting the communication resource in the exceptional resource pool according to a partial sensing result; and in response to meeting the triggering condition of partial sensing and determining that the partial sensing manner fails to be used, selecting the communication resource in the exceptional resource pool by using the random selection manner.

The indication information about the partial sensing may include: a threshold, a timer or other triggering conditions.

Alternatively, when the quality of the signal received by the UE is lower than the threshold, the UE starts performing the partial sensing.

Alternatively, when the timer is exceeded, the UE starts performing the partial sensing.

The other triggering conditions may be a condition that the required resource may not be sensed in a normal resource pool. That is, when the UE may not sense the required resource in the normal resource pool, the UE starts performing the partial sensing.

Alternatively, the determining that the partial sensing manner fails to be used includes one of: in response to determining that the partial sensing manner does not meet a delay requirement of a first service, determining that the partial sensing manner fails to be used; in response to determining that the UE fails to select a required communication resource in the partial sensing manner, determining that the partial sensing manner fails to be used; and in response to determining that the UE does not have a capability of receiving data through an air interface between the UEs, determining that the partial sensing manner fails to be used.

Alternatively, when the UE does not have the capability of receiving data through the air interface between the UEs, the base station instructs another terminal which has a capability of receiving data through an air interface between UEs and is in a neighboring area (such as a cell from the UE 1 km) of the UE to transmit a sensing result of the exceptional resource pool to the base station, and the base station transmits the received sensing result to the UE.

The capability to receive the data through the air interface between the UEs may be a PC5 reception capability.

The PC5 reception capability may be a capability of receiving the data through the PC5 interface.

In an embodiment, the step of performing partial sensing on the exceptional resource pool, and selecting the communication resource in the exceptional resource pool according to the partial sensing result includes: excluding communication resources which do not meet the requirement in the exceptional resource pool, if remaining communication resources are insufficient, the terminal resets the partial sensing threshold and re-performs the partial sensing according to the reset threshold until the remaining communication resources meet the requirement.

In an embodiment, the step of determining the exceptional resource pool and the selection manner based on the communication resource selection indication information, and selecting the communication resource in the exceptional resource pool according to the determined selection manner includes: in response to determining that the selection manner carried in the communication resource selection indication information is the random selection manner, selecting the communication resource in the exceptional resource pool by using the random selection manner.

The V2V communications and the V2P communications may be provided with different exceptional resource pools. If the P-UE has the PC5 reception capability, the P-UE may sense (pre-sense or partially sense) the communication resources in the exceptional resource pool and select the corresponding communication resource. If the P-UE does not have the PC5 reception capability, the P-UE may randomly select the communication resource in the exceptional resource pool.

If the used sensing manner fails to meet the delay requirement or if an eNB or a pre-configuration indicates that the resource is selected by using the random selection manner, a vehicle-UE (V-UE) randomly selects the communication resource in the exceptional resource pool.

Alternatively, if the V-UE uses the sensing manner and the sensing manner fails to meet the delay requirement of the first service, the eNB instructs the V-UE to select the resource by using the random selection manner or pre-configured information of the V-UE instructs the V-UE to select the resource (i.e., the communication resource) by using the random selection manner, and then the V-UE randomly selects the communication resource in the exceptional resource pool.

If the UE for selecting the resource uses a half-duplex manner (that is, the UE may not simultaneously receive data and transmit data at one moment), the UE for selecting the resource fails to detect a resource conflict. At this time, a third-party UE (such as a UE which is in a sensing process and has not selected the resource) may be used to detect the resource conflict.

Alternatively, if the UE for selecting the resource uses the half-duplex manner (that is, the UE may not simultaneously receive data and transmit data at one moment), the UE for selecting the resource, when selecting the resource, detects the resource conflict by using a mute manner. If the resource conflict is detected, the resource conflict may be solved in following manners: if priorities of multiple UEs for selecting the resource are different, UEs with higher priorities preferentially occupy resources, and UEs with lower priorities re-select resources; and if priorities of multiple UEs for selecting the resource are the same, the UEs occupy resources by using a random probability manner or simultaneously re-select resources.

In an example, the UE determines whether to use the sending manner to select the resource according to the communication resource selection indication information and a PC5 link state. For example, when the indication information (i.e., the communication resource selection indication information) indicates that the UE uses the pre-sensing manner, and when a threshold of a parameter of a signal measured by the UE meets a setting value, the UE uses the pre-sensing manner to select the PC5 communication resource.

For example, when the indication information includes using the partial sensing manner and a range of resources partially sensed, the UE senses and selects the resource in the range of resources partially sensed.

If the communication resource selection indication information indicates that the UE uses the random selection manner, or if the indication information indicates that the UE uses the sensing manner and the sensing manner fails to meet the delay requirement, the UE uses the random selection manner. For example, when the UE uses the pre-sensing manner, the UE determines whether to start the pre-sensing according to a signal threshold in the indication information and a parameter value (i.e., a measurement value) of the measured signal. If the measurement value is lower than the threshold, the UE pre-senses the communication resources in the exceptional resource pool, and selects the resource according to the sensing result.

When the UE uses the partial sensing manner, the UE senses and selects the resource according to the range of resources partially sensed (such as a range of subframes in the resource pool) in the indication information. The UE determines that the random selection manner is used. For example, if the indication information indicates that the random selection manner is used or if the UE determines that the sensing manner fails to be used according to the indication information, the UE randomly selects the PC5 communication resource in the exceptional resource pool.

The V2X communications in the Mode 4 may uses the exceptional resource pool. The resource selection method in the embodiments described above may be applied to a scenario where the UE automatously selects a V2X resource, i.e., the Mode 4.

The resource selection method in the embodiments described above may allow the terminal to automatously select the communication resource.

Figure 4:
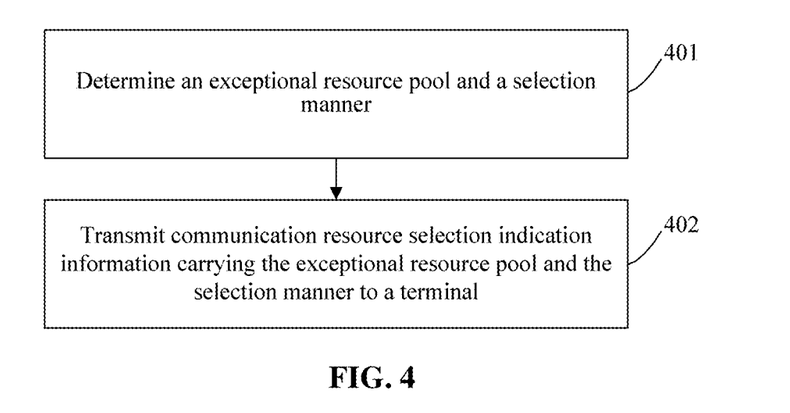
FIG. 4 is a flowchart of another resource selection method according to an embodiment.

FIG. 4 is a flowchart of another resource selection method according to an embodiment of the present disclosure, and the method is applied to a device at a network side. As shown in FIG. 4, the resource selection method includes steps described below.

In step 401, an exceptional resource pool and a selection manner are determined. The selection manner is a manner of selecting a communication resource from the exceptional resource pool.

Alternatively, the selection manner includes one of: a random selection manner, a pre-sensing manner, and a partial sensing manner.

Alternatively, the communication resource selection indication information further includes at least one of: a triggering condition of the selection manner; and a condition for stopping selecting the communication resource in the selection manner.

In an embodiment, the step of determining the exceptional resource pool and the selection manner includes: determining the exceptional resource pool and the selection manner according to an exceptional resource pool and a selection manner which are pre-configured.

In an embodiment, the step of determining the exceptional resource pool and the selection manner includes: indicating, by a base station, the exceptional resource pool and the selection manner according to a current communication resource situation and a quality of service (QoS) demand of first service data.

In an embodiment, the exceptional resource pool and the selection manner which are pre-configured include: an exceptional resource pool and a selection manner pre-configured by the base station; or an exceptional resource pool and a selection manner pre-configured by another device (such as a V2X control function) other than the base station.

For example, the exceptional resource pool refers to a resource pool which is used for PC5 interface communications and which may be temporarily used when an exceptional event occurs. The exceptional resource pool may be configured by the eNB (for example, when the UE is in a coverage range of the eNB) or may be pre-configured by the UE. The exceptional resource pool pre-configured by the UE may be stored in a memory or a UICC of the UE.

The exceptional event may include at least one of: a handover (HO), a radio link failure (RLF), and a resource pool update.

In an embodiment, the exceptional resource pool includes: time domain resource information and frequency domain resource information. The time domain resource takes a subframe as a unit. The frequency domain resource takes an RB or a sub-channel as a unit, and the sub-channel is multiple continuous RBs. For example, the exceptional resource pool may be used for the PSCCH and/or the PSSCH.

In step 402, communication resource selection indication information carrying the exceptional resource pool and the selection manner is transmitted to a terminal.

Alternatively, the communication resource selection indication information is transmitted through one of: a system broadcast message, an RRC signaling, a MAC signaling, and a physical layer signaling.

The RRC signaling may be an RRC signaling used for dedicatedly transmitting the communication resource selection indication information.

The resource selection method in the embodiments described above may allow the terminal to automatously select the communication resource.

Figure 5:
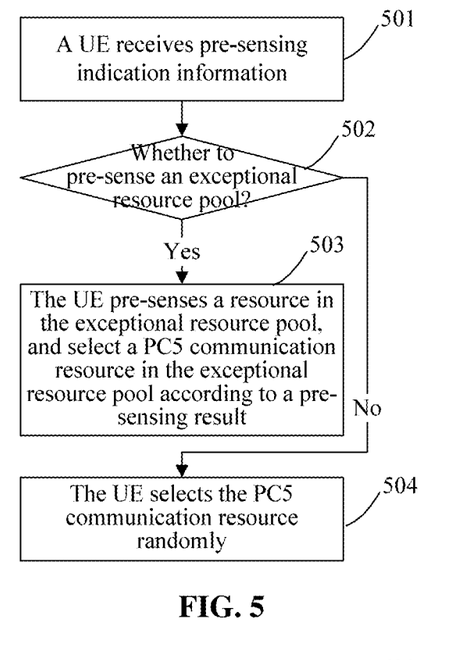
FIG. 5 is a flowchart of a method for a UE pre-sensing a communication resource in a PC5 communication exceptional resource pool according to an embodiment.

In an embodiment, the exceptional resource pool is a PC5 communication exceptional resource pool (i.e., an exceptional resource pool of PC5 communication resources). The communication resource selection indication information is indication information including the pre-sensing manner, i.e., pre-sensing indication information. The embodiment provides a method for the UE pre-sensing the PC5 communication exceptional resource pool. As shown in FIG. 5, the method includes steps described below.

In step 501, the UE receives the pre-sensing indication information.

The received pre-sensing indication information is one of: pre-sensing indication information transmitted by the eNB or pre-sensing indication information pre-configured by the UE.

The pre-sensing indication information includes: an exceptional resource pool.

The pre-sensing indication information may further include: a threshold, a timer or other triggering conditions.

The pre-sensing indication information may further include: a condition for stopping the pre-sensing.

Alternatively, when a quality of a signal received by the UE is lower than the threshold, the UE pre-senses the exceptional resource pool. Alternatively, when the timer is exceeded, the UE pre-senses the exceptional resource pool.

The other triggering conditions may include a condition that the required resource(s) cannot be sensed in the exceptional resource pool.

The condition for stopping the pre-sensing may include one of following conditions that: the quality of the signal received by the UE is higher than the threshold, a time limit of the pre-sensing is exceeded, and a normal resource (a communication resource except for the communication resources in the exceptional resource pool) is obtained through the Mode3 or other manners.

In step 502, the UE determines whether to pre-sense the exceptional resource pool. If the UE pre-senses the exceptional resource pool, go to step 503. If the UE does not pre-sense the exceptional resource pool, go to step 504.

In an embodiment, the step that the UE determines whether to pre-sense the exceptional resource pool includes: the UE determining whether to pre-sense the exceptional resource pool according to a triggering condition of pre-sensing.

For example, when the quality of the signal received by the UE is lower than the threshold, or when the timer is exceeded, or when the UE fails to sense the required resource in the normal resource pool, the UE pre-senses the exceptional resource pool.

When the UE fails to pre-sense the required resource, or when the UE does not have the PC5 reception capability, or when the sensed resource does not meet a requirement, the UE may use the random selection manner to select the communication resource.

In step 503, the UE pre-senses the communication resource in the exceptional resource pool.

In an embodiment, the step that the UE pre-senses the communication resource in the exceptional resource pool includes: the UE performing the pre-sensing in the exceptional resource pool. That is, after resources which do not meet the requirement are excluded, if remaining resources are insufficient, a threshold of pre-sensing is reset and the UE re-performs the pre-sensing until the remaining resources meet the requirement.

In step 504, the UE selects a required PC5 communication resource.

In an embodiment, the step that the UE selects the required PC5 communication resource includes: the UE selecting the PC5 communication resource in the exceptional resource pool according to a pre-sensing result, or randomly selecting the PC5 communication resource.

The PC5 communication resource may be a communication resource used for the UE transmitting a V2X service on the PC5 interface.

Figure 6:
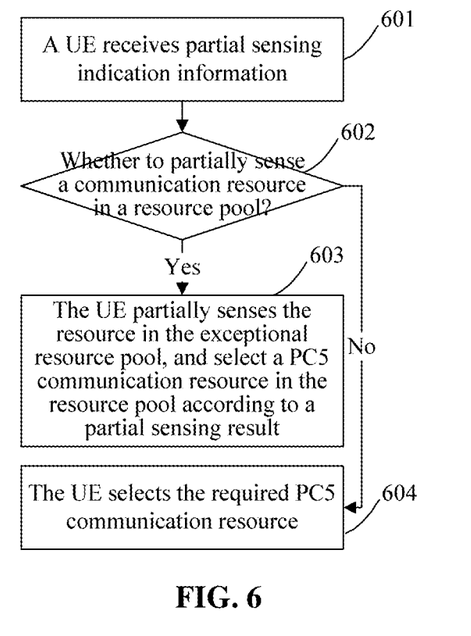
FIG. 6 is a flowchart of a method for a UE partially sensing a communication resource in a PC5 communication exceptional resource pool according to an embodiment.

In an embodiment, the exceptional resource pool is the PC5 communication exceptional resource pool. The communication resource selection indication information is indication information including the partial sensing manner, i.e., partial sensing indication information. The embodiment provides a method for the UE partially sensing the PC5 communication exceptional resource pool. As shown in FIG. 6, the method includes steps described below.

In step 601, the UE receives the partial sensing indication information.

The partial sensing indication information is one of: partial sensing indication information transmitted by the eNB or partial sensing indication information pre-configured by the UE.

The partial sensing indication information includes a resource pool and a time range of partial sensing. The resource pool includes one of: a normal resource pool and an exceptional resource pool.

The partial sensing manner refers to a manner that a part of or all of communication resources is sensed in the resource pool.

The partial sensing indication information may further include: a threshold, a timer or other triggering conditions.

The partial sensing indication information may further include: a condition for stopping the partial sensing.

Alternatively, when the quality of the signal received by the UE is lower than the threshold, the UE starts performing the partial sensing.

Alternatively, when the timer is exceeded, the UE starts performing the partial sensing.

The other triggering conditions may be a condition that required resources cannot be sensed in the normal resource pool. That is, when the UE fails to sense the required resources in the normal resource pool, the UE starts performing the partial sensing.

The condition for stopping the partial sensing includes one of following conditions that: the quality of the signal received by the UE is higher than the threshold, a time limit of the partial sensing is exceeded, and normal resources are obtained by the Mode3 or other manners.

In step 602, the UE determines whether to perform the partial sensing. If the UE performs the partial sensing, go to step 603. If the UE does not perform the partial sensing, go to step 604.

In an embodiment, the step that the UE determines whether to perform the partial sensing includes: the UE determining whether to perform the partial sensing according to a triggering condition of partial sensing.

The triggering condition of partial sensing may be a condition that: the quality of the signal received by the UE is lower than the threshold, or the timer is exceeded, or the UE fails to sense the required resources in the normal resource pool. When the UE fails to partially sense the required resources, or when the UE does not have the PC5 reception capability, or when the sensed resources do not meet the requirement, the UE uses the random selection manner to select communication resources.

In step 603, the UE partially senses the communication resources in the resource pool.

In an embodiment, the step that the UE partially senses the communication resources in the resource pool includes: after resources which do not meet the requirement are excluded, if remaining resources are insufficient, resetting a threshold of partial sensing and the UE re-performing the partial sensing until the remaining resources meet the requirement.

The resource pool includes one of: the normal resource pool and the exceptional resource pool.

In step 604, the UE selects the required PC5 communication resources.

In an embodiment, the step that the UE selects the required PC5 communication resources includes: the UE selecting the PC5 communication resources in the resource pool according to a partial sensing result, or randomly selecting the PC5 communication resources.

The PC5 communication resources may be used for the UE transmitting V2X services on the PC5 interface.

Figure 7:
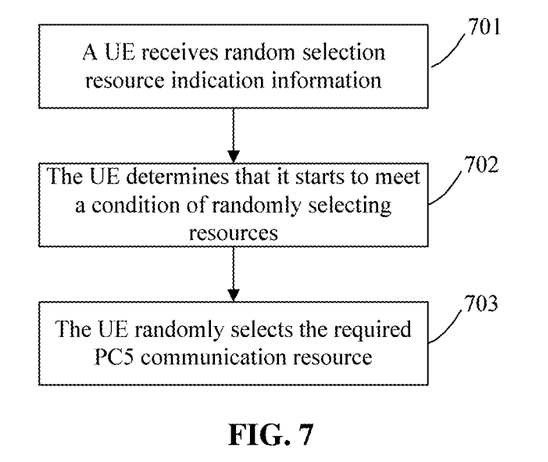
FIG. 7 is a flowchart of a method for a UE randomly selecting a communication resource in a PC5 communication exceptional resource pool according to an embodiment.

In an embodiment, the exceptional resource pool is the PC5 communication exceptional resource pool. The communication resource selection indication information is indication information including the random selection manner, i.e., random selection resource indication information. The embodiment provides a method for the UE randomly selecting the PC5 communication exceptional resource pool. As shown in FIG. 7, the method includes steps described below.

In step 701, the UE receives the random selection resource indication information.

The received random selection resource indication information is transmitted by the eNB or pre-configured by the UE.

The random selection resource indication information includes: an exceptional resource pool.

Alternatively, the random selection resource indication information further includes: a triggering condition of random selection.

Alternatively, the random selection resource indication information further includes: a triggering condition for stopping the random selection.

The triggering condition of random selection may include one of the following conditions that: a cell handover occurs, the required communication resource cannot be selected in the normal resource pool, and the communication resource sensed in the resource pool does not meet a requirement.

The triggering condition for stopping the random selection may include one of the following conditions that: a timer is exceeded, the cell handover ends, and the required resource is obtained in the normal resource pool or through the Mode3.

Alternatively, the random selection refers to that in the exceptional resource pool, services with the same priority have the same probability of being selected, and services with higher priorities have a higher probability of being selected. If there is a resource conflict when a service with a higher priority and a service with a lower priority select the communication resource(s), the service with the higher priority preferentially use the communication resource(s).

In step 702, the UE determines a condition that needs to be met for randomly selecting resources.

In an embodiment, the step that the UE determines the condition that needs to be met for randomly selecting resources includes: the UE determining the condition that needs to be met according to the received random selection indication information.

For example, when the UE performs the cell handover and receives exceptional resource pool information, if the required communication resource cannot be selected in the normal resource pool or if the communication resource in the resource pool does not meet the requirements, the UE determines that the random selection manner is used to select the communication resource.

In step 703, the UE randomly selects the communication resource in the exceptional resource pool.

In an embodiment, the step that the UE randomly selects the communication resource in the exceptional resource pool includes: the UE randomly selecting a required PC5 communication resource in the exceptional resource pool.

The PC5 communication resource is used for the UE transmitting a V2X service on the PC5 interface.

Figure 8:
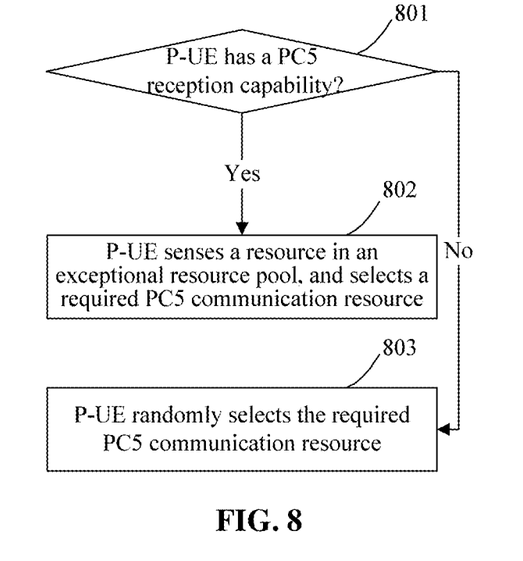
FIG. 8 is a flowchart of a method for a P-UE randomly selecting a communication resource according to an embodiment.

An embodiment takes that the exceptional resource pool is a PC5 communication exceptional resource pool as an example. The embodiment provides a method for a P-UE randomly selecting the communication resource. As shown in FIG. 8, the method includes steps described below.

In step 801, the P-UE determines whether it has the PC5 reception capability. If the P-UE has the PC5 reception capability, go to step 802. If the P-UE does not have the PC5 reception capability, go to step 803.

Alternatively, the step that the P-UE determines whether it has the PC5 reception capability includes: the P-UE determining whether a receiver has the PC5 reception capability. If the receiver has the PC5 reception capability, the sensing manner is used to select the resource. If the receiver does not have the PC5 reception capability, the random selection manner is used to select the resource.

In step 802, the P-UE senses the resource in the exceptional resource pool and selects the required PC5 communication resource.

The sensing manner may include one of: a pre-sensing manner, and a partial sensing manner.

Alternatively, the indication information transmitted by the eNB includes a triggering condition of the sensing manner and a condition for stopping using the sensing manner to select the communication resource.

Alternatively, the triggering condition of the sensing manner and the condition for stopping using the sensing manner to select the communication resource are pre-configured in the UE.

In step 803, the P-UE randomly selects the PC5 communication resource.

If the P-UE does not have the PC5 reception capability, the P-UE randomly selects the required PC5 communication resource in the exceptional resource pool.

Figure 9:
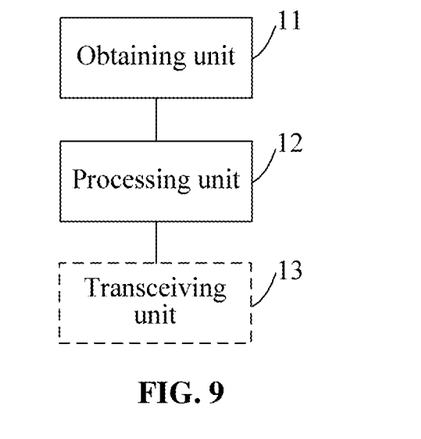
FIG. 9 is a schematic diagram of a resource selection device according to an embodiment.

An embodiment provides a resource selection device. The structure of the resource selection device is as shown in FIG. 9. In this embodiment, the resource selection device may be disposed in a terminal. The resource selection device includes an obtaining unit 11 and a processing unit 12.

The obtaining unit 11 is configured to obtain communication resource selection indication information.

The processing unit 12 is configured to determine an exceptional resource pool and a selection manner based on the communication resource selection indication information, and select a communication resource in the exceptional resource pool according to the determined selection manner.

The resource selection device may further include a transceiving unit 13.

The transceiving unit 13 is configured to perform at least one of following operations: transmitting first service data by using the communication resource, and receiving the first service data by using the communication resource. The communication resource is an air interface resource between UEs. The exceptional resource pool is a resource pool of communication resources used by the UE to autonomously select the first service data. The exceptional resource pool includes an exceptional resource pool configured by a base station, or a pre-configured exceptional resource pool.

In an embodiment, the obtaining unit 11 is further configured to: receive communication resource selection indication information transmitted by a network side; or obtain pre-configured communication resource selection indication information.

Alternatively, the communication resource selection indication information includes the exceptional resource pool and the selection manner.

The communication resource selection indication information further includes at least one of: a triggering condition of the selection manner; and a condition for stopping selecting the communication resource in the selection manner.

Alternatively, the selection manner includes one of: a random selection manner, a pre-sensing manner, and a partial sensing manner.

In an embodiment, the processing unit 12 is configured to: in response to determining that the selection manner carried in the communication resource selection indication information is the pre-sensing manner, determine whether a triggering condition of pre-sensing is met; in response to meeting the triggering condition of pre-sensing, perform the pre-sensing on the exceptional resource pool and select the communication resource in the exceptional resource pool according to a pre-sensing result; and in response to meeting the triggering condition of pre-sensing and determining that the pre-sensing manner cannot be used, select the communication resource in the exceptional resource pool by using the random selection manner.

The processing unit 12 determining that the pre-sensing manner cannot be used may include one of: determining that the pre-sensing manner cannot be used when the pre-sensing manner does not meet a delay requirement of a first service; determining that the pre-sensing manner cannot be used when the UE fails to select a required communication resource in the pre-sensing manner; and determining that the pre-sensing manner cannot be used when the UE does not have a capability of receiving data through an air interface between the UEs.

In an embodiment, the processing unit 12 is configured to: in response to determining that the selection manner carried in the communication resource selection indication information is the partial sensing manner, determine whether a triggering condition of partial sensing is met; in response to meeting the triggering condition of partial sensing, perform the partial sensing on the exceptional resource pool and select the communication resource in the exceptional resource pool according to a partial sensing result; and in response to meeting the triggering condition of partial sensing and determining that the partial sensing manner cannot be used, select the communication resource in the exceptional resource pool by using the random selection manner.

In an embodiment, the processing unit 12 is configured to select the communication resource in the exceptional resource pool by using the random selection manner in response to determining that one of: the selection manner carried in the communication resource selection indication information is the random selection manner, or the selection manner carried in the communication resource selection indication information is the pre-sensing manner and the terminal determines that the pre-sensing manner cannot be used, or the selection manner carried in the communication resource selection indication information is the partial sensing manner and the terminal determines that the partial sensing manner cannot be used.

The processing unit 12 determining that the partial sensing manner cannot be used may include one of: determining that the partial sensing manner cannot be used when the partial sensing manner does not meet a delay requirement of a first service; determining that the partial sensing manner cannot be used when the UE fails to select a required communication resource in the partial sensing manner; or determining that the partial sensing manner cannot be used when the UE does not have a capability of receiving data through an air interface between the UEs.

The terminal may be at least one of: a vehicle-mounted unit device, a road side unit device, a UE, a V-UE, a P-UE, a wearable device, a relay device, an Internet of Things (IOT) terminal and a machine type communication (MTC) terminal.

Functions of the multiple units in the resource selection device in the above embodiments may refer to the related description of the foregoing resource selection method. The multiple units in the resource selection device in the above embodiments may be implemented by an analog circuit, or may be implemented by software for executing the functions in the above embodiments. The software may be performed on an intelligent terminal.

In the above embodiments, the obtaining unit 11 and the processing unit 12 in the resource selection device may be implemented by a central processing unit (CPU), a digital signal processor (DSP) or a field programmable gate array (FPGA) disposed in the resource selection device or disposed in a terminal to which the resource selection device belongs. The transceiving unit 13 in the resource selection device may be implemented by a transceiver disposed in the resource selection device or disposed in the terminal to which the resource selection device belongs.

The resource selection device in the above embodiments may allow the terminal to automatously select the communication resource.

Figure 10:
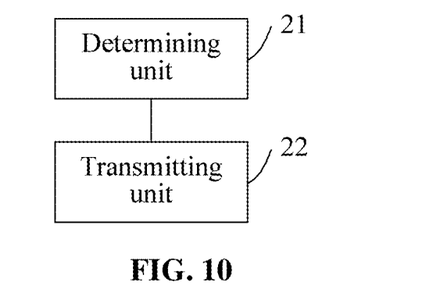
FIG. 10 is a schematic diagram of another resource selection device according to an embodiment.

An embodiment provides a resource selection device. The structure of the resource selection device is as shown in FIG. 10. In this embodiment, the resource selection device may be disposed in a radio access network device, such as a base station. The resource selection device includes a determining unit 21 and a transmitting unit 22.

The determining unit 21 is configured to determine an exceptional resource pool and a selection manner. The selection manner is a manner of selecting a communication resource from the exceptional resource pool.

The transmitting unit 22 is configured to transmit communication resource selection indication information carrying the exceptional resource pool and the selection manner to a terminal.

In an embodiment, the determining unit 21 is further configured to: determine the exceptional resource pool and the selection manner according to an exceptional resource pool and a selection manner which are pre-configured.

In an embodiment, the determining unit 21 determining the exceptional resource pool and the selection manner includes: determining the exceptional resource pool and the selection manner according to a current communication resource situation and a QoS demand of first service data.

Alternatively, the transmitting unit 22 transmits the communication resource selection indication information through at least one of: a system broadcast message, an RRC signaling, a MAC signaling, and a physical layer signaling.

Alternatively, the selection manner includes one of: a random selection manner, a pre-sensing manner, and a partial sensing manner.

Alternatively, the communication resource selection indication information further includes at least one of: a triggering condition of the selection manner; and a condition for stopping selecting the communication resource in the selection manner.

Functions of multiple units in the resource selection device in above embodiments may refer to the related description of the foregoing resource selection method. The multiple units in the resource selection device in the above embodiments may be implemented by an analog circuit, or may be implemented by software for executing the functions in the above embodiments. The software may be performed on an intelligent terminal.

In this embodiment, the determining unit 21 in the resource selection device may be implemented by a CPU, or an MPU, or a DSP, or an FPGA or the like disposed in the resource selection device or in the terminal to which the resource selection device belongs. The transmitting unit 22 in the resource selection device may be implemented by a transceiver disposed in the resource selection device or disposed in the terminal to which the resource selection device belongs.

The resource selection device in the above embodiments may allow the terminal to automatously select the communication resource.

Figure 11:
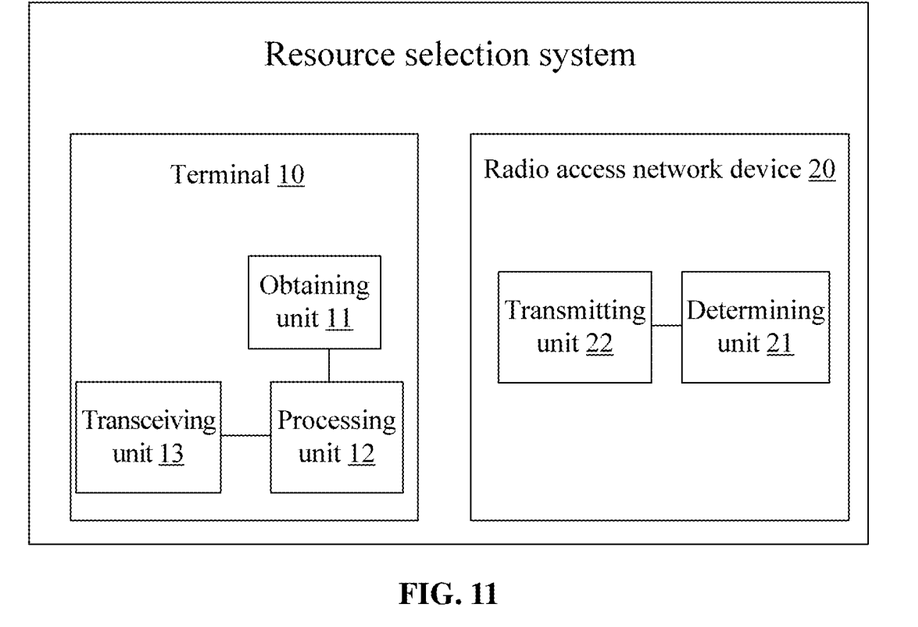
FIG. 11 is a structural diagram of a resource selection system according to an embodiment.

An embodiment provides a resource selection system. As shown in FIG. 11, the resource selection system includes a terminal 10 and a radio access network device 20.

The radio access network device 20 determines an exceptional resource pool and a selection manner for selecting a communication resource form the exceptional resource pool, and transmits communication resource selection indication information to the terminal 10.

The terminal 10 obtains the communication resource selection indication information, determines the exceptional resource pool and the selection manner based on the communication resource selection indication information, and selects the communication resource in the exceptional resource pool according to the determined selection manner.

Alternatively, the terminal 10 includes an obtaining unit 11, a processing unit 12 and a transceiving unit 13.

The obtaining unit 11 is configured to obtain the communication resource selection indication information.

The processing unit 12 is configured to determine the exceptional resource pool and the selection manner based on the communication resource selection indication information, and select the communication resource in the exceptional resource pool according to the determined selection manner.

The transceiving unit 13 is configured to perform at least one of following operations: transmitting first service data by using the communication resource; and receiving the first service data by using the communication resource. The communication resource is an air interface resource between UEs. The exceptional resource pool is a resource pool of communication resources used by the UE to autonomously select the first service data. The exceptional resource pool includes an exceptional resource pool configured by a base station, or an exceptional resource pool pre-configured by a terminal.

Alternatively, the radio access network device 20 includes a determining unit 21 and a transmitting unit 22.

The determining unit 21 is configured to determine the exceptional resource pool and the selection manner. The selection manner is a manner of selecting the communication resource from the exceptional resource pool.

The transmitting unit 22 is configured to transmit the communication resource selection indication information carrying the exceptional resource pool and the selection manner to the terminal.

For example, a V-UE1 performs V2X communications with a V-UE2 through a PC5 interface. The V-UE1 receives indication information transmitted by a base station through a Uu interface.

Alternatively, when the V-UE1 performs a cell handover, the V-UE1 determines whether to perform the pre-sending. If the V-UE1 performs the pre-sensing, the V-UE1 performs the pre-sensing on the exceptional resource pool, and selects a required PC5 communication resource according to a sensing result. If the V-UE1 does not perform the pre-sensing, the V-UE1 randomly selects the required PC5 communication resource in the exceptional resource pool.

The multiple units or components in the above embodiments may be combined or may be integrated in another system, or some features may be omitted or are not implemented. In addition, coupling or communication connections between the presented or discussed components may be implemented through some interfaces, and indirect coupling or communication connections between devices or units may be electronic or mechanic.

The units described above as separate components may or may not be physically separated. Components presented as units may or may not be physical units, i.e., may be located in one place or may be distributed on multiple network units.

The multiple units in the above embodiments may all be integrated in one processing unit, or each unit may be separately presented as one unit, or two or more units may be integrated in one unit. The integrated unit may be implemented by hardware or may be implemented by hardware plus a software function unit.

An embodiment provides a computer-readable storage medium configured to store computer-executable instructions for executing the method in any one of embodiments.

Figure 12:
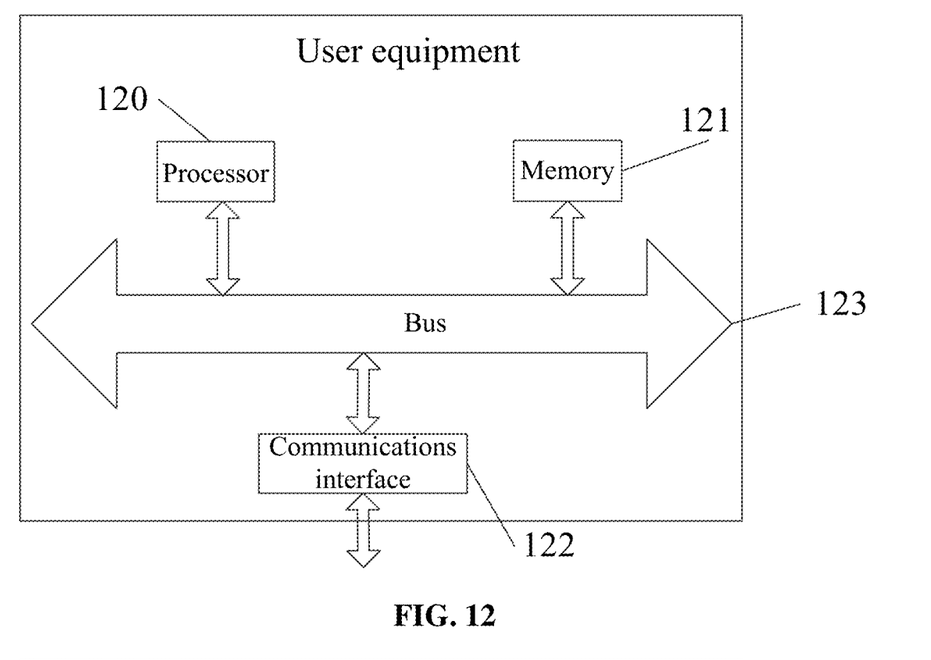
FIG. 12 is a structural diagram of hardwares of a user equipment according to an embodiment.

An embodiment provides a schematic diagram of a hardware structure of a UE. Referring to FIG. 12, the UE includes: at least one processor 120 (FIG. 12 shows one processor 120 by way of example) and a memory 121; and the UE may further include a communications interface 122 and a bus 123. The processor 120, the memory 121 and the communications interface 122 may communicate with each other via the bus 123. The processor 120 may call logic instructions in the memory 121 to perform the method executed by the UE in the above embodiments.

In addition, the logic instructions in the memory 121 may be implemented in the form of a software function unit and, when sold or used as an independent product, may be stored in a computer-readable storage medium.

As a computer-readable storage medium, the memory 121 may be used for storing software programs and computer-executable programs, such as program instructions or modules corresponding to the method executed by the UE in the above embodiments. The processor 120 runs the software programs, instructions or modules stored in the memory 121 to execute function applications and data processing, that is, to implement the method executed by the UE in the above embodiments.

The memory 121 may include a program storage region and a data storage region. The program storage region may store an operating system and an application program required by at least one function; and the data storage region may store data created depending on use of a terminal device. In addition, the memory 121 may include a high-speed random access memory, or may include a non-volatile memory.

Figure 13:
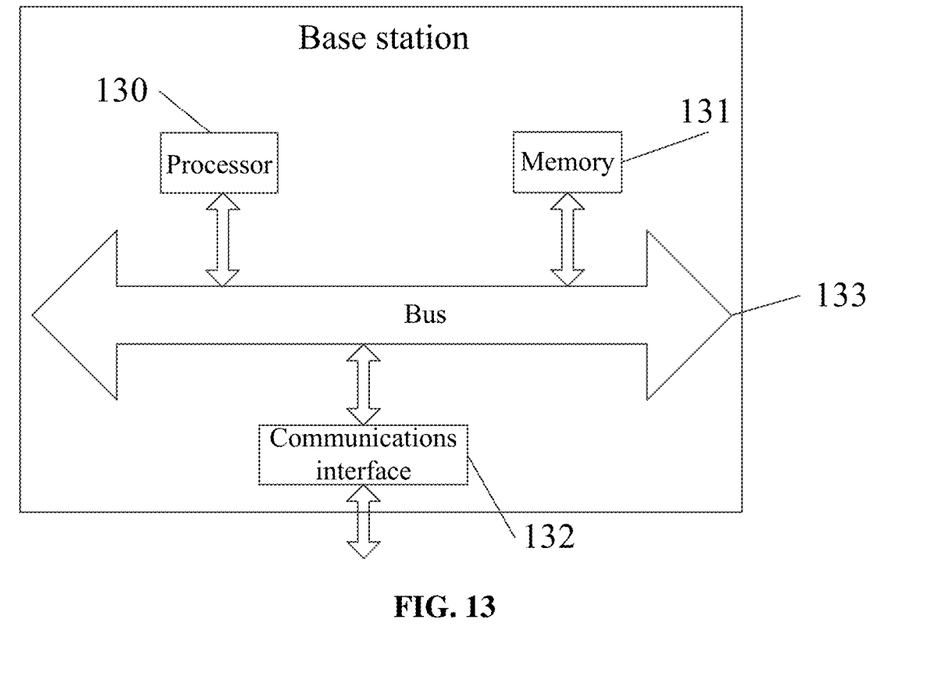
FIG. 13 is a schematic diagram of hardwares of a base station according to an embodiment.

An embodiment provides a schematic diagram of a hardware structure of a base station. Referring to FIG. 13, the base station includes: at least one processor 130 (FIG. 13 shows one processor 130 by way of example) and a memory 131; and the base station may further include a communications interface 132 and a bus 133. The processor 130, the memory 131 and the communications interface 132 may communicate with each other via the bus 133. The processor 130 may call logic instructions in the memory 131 to execute the method executed by the base station in the above embodiments.

In addition, the logic instructions in the memory 131 may be implemented in the form of a software function unit and, when sold or used as an independent product, may be stored in a computer-readable storage medium.

As a computer-readable storage medium, the memory 131 may be used for storing software programs and computer-executable programs, such as program instructions or modules corresponding to the method executed by the base station in the above embodiments. The processor 130 runs the software programs, instructions or modules stored in the memory 131 to execute function applications and data processing, that is, to implement the method executed by the base station in the above embodiments.

The memory 131 may include a program storage region and a data storage region. The program storage region may store an operating system and an application program required by at least one function; and the data storage region may store data created depending on use of a terminal device. In addition, the memory 131 may include a high-speed random access memory, or may include a non-volatile memory.

The above-mentioned technical solutions may be embodied in the form of a software product. The computer software product is stored in a storage medium and includes one or more instructions for enabling a computer device (which may be a personal computer, server, network device, etc.) to execute all or part of the steps of the method provided in the above embodiments.

The foregoing storage medium may be a non-transient storage medium, such as a USB disk, a mobile hard disk, a read-only memory (ROM), a random access memory (RAM), a magnetic disk, or an optical disk; or the foregoing storage medium may be a transient storage medium.

INDUSTRIAL APPLICABILITY

The resource selection method and device may allow a UE to automatously select a communication resource.

What is claimed is:

1. A communication resource selection method, comprising:
    obtaining communication resource selection indication information; and
    determining an exceptional resource pool and a selection manner based on the communication resource selection indication information, and selecting a communication resource in the exceptional resource pool according to the determined selection manner,
    wherein the communication resource selection indication information comprises: the exceptional resource pool and the selection manner, and the selection manner comprises a partial sensing manner;
    wherein the determining the exceptional resource pool and the selection manner based on the communication resource selection indication information, and selecting the communication resource in the exceptional resource pool according to the determined selection manner comprises:
    in response to determining that the selection manner carried in the communication resource selection indication information is the partial sensing manner, determining whether a triggering condition of partial sensing is met;
    in response to meeting the triggering condition of partial sensing, performing the partial sensing on the exceptional resource pool, and selecting the communication resource in the exceptional resource pool according to a partial sensing result; and
    in response to meeting the triggering condition of partial sensing and determining that the partial sensing manner fails to be used, selecting the communication resource in the exceptional resource pool by using the random selection manner.

2. The method of claim 1, further comprising at least one of:
    transmitting first service data by using the communication resource; and
    receiving the first service data by using the communication resource;
    wherein the communication resource is an air interface resource between user equipments (UEs), the exceptional resource pool is a resource pool of communication resources used by the UE to autonomously select the first service data, and the exceptional resource pool comprises one of: an exceptional resource pool configured by a base station, and a pre-configured exceptional resource pool.

3. The method of claim 1, wherein the obtaining communication resource selection indication information comprises:
   receiving communication resource selection indication information transmitted by a network side; or
   obtaining pre-configured communication resource selection indication information.

4. The method of claim 1, wherein the determining that the partial sensing manner fails to be used comprises one of:
   in response to determining that the partial sensing manner does not meet a delay requirement of a first service, determining that the partial sensing manner fails to be used;
   in response to determining that a UE fails to select a required communication resource in the partial sensing manner, determining that the partial sensing manner fails to be used; and
   in response to determining that the UE does not have a capability of receiving data through an air interface between the UEs, determining that the partial sensing manner fails to be used.

5. A computer-readable non-transient storage medium, which is configured to store computer-executable instructions for executing the method of claim 1.

6. The method of claim 1, wherein the communication resource selection indication information further comprises at least one of the following information:
   a triggering condition corresponding to the selection manner; or
   a condition for stopping selecting the communication resource in the selection manner.

7. A communication resource selection method, comprising:
   determining an exceptional resource pool and a selection manner, wherein the selection manner is a manner of selecting a communication resource from the exceptional resource pool, and the selection manner comprises a partial sensing manner; and
   transmitting communication resource selection indication information carrying the exceptional resource pool and the selection manner to a user equipment (UE), so that the UE performs operations of:
   in response to determining that the selection manner carried in the communication resource selection indication information is the partial sensing manner, determining whether a triggering condition of partial sensing is met;
   in response to meeting the triggering condition of partial sensing, performing the partial sensing on the exceptional resource pool, and selecting the communication resource in the exceptional resource pool according to a partial sensing result; and
   in response to meeting the triggering condition of partial sensing and determining that the partial sensing manner fails to be used, selecting the communication resource in the exceptional resource pool by using the random selection manner.

8. The method of claim 7, wherein the determining an exceptional resource pool and a selection manner comprises:
   determining the exceptional resource pool and the selection manner according to a pre-configured exceptional resource pool and selection manner.

9. The method of claim 7, wherein the determining an exceptional resource pool and a selection manner comprises:
   determining the exceptional resource pool and the selection manner according to a current communication resource situation and a quality of service (QoS) demand of first service data.

10. A communication resource selection device, comprising: a processor and a storage device, wherein the storage device stores processor-executable programs for executing the method according to claim 7.

11. The method of claim 7, wherein the communication resource selection indication information further comprises at least one of the following information:
   a triggering condition corresponding to the selection manner; or
   a condition for stopping selecting the communication resource in the selection manner.

12. A communication resource selection device, comprising a processor and a storage device, wherein the storage device stores processor-executable programs, and the processor comprises:
   an obtaining unit, which is configured to obtain communication resource selection indication information; and
   a processing unit, which is configured to determine an exceptional resource pool and a selection manner based on the communication resource selection indication information, and select a communication resource in the exceptional resource pool according to the determined selection manner,
   wherein the communication resource selection indication information comprises: the exceptional resource pool and the selection manner, and the selection manner comprises a partial sensing manner;
   wherein the processing unit is further configured to:
   in response to determining that the selection manner carried in the communication resource selection indication information is the partial sensing manner, determine whether a triggering condition of partial sensing is met;
   in response to meeting the triggering condition of partial sensing, perform the partial sensing on the exceptional resource pool, and select the communication resource in the exceptional resource pool according to a partial sensing result; and
   in response to meeting the triggering condition of partial sensing and determining that the partial sensing manner fails to be used, select the communication resource in the exceptional resource pool by using the random selection manner.

13. The device of claim 12, wherein one of the followings is comprised in the device:
   the processor comprises a transceiving unit, which is configured to perform at least one of following operations: transmitting first service data by using the communication resource, and receiving the first service data by using the communication resource, wherein the communication resource is an air interface resource between user equipments (UEs), the exceptional resource pool is a resource pool of communication resources used by the UE to autonomously select the first service data, and the exceptional resource pool comprises one of: an exceptional resource pool configured by a base station, and a pre-configured exceptional resource pool; and
   the obtaining unit is further configured to: receive the communication resource selection indication information transmitted by a network side, or obtain the communication resource selection indication information pre-configured.

14. The device of claim 12, wherein the communication resource selection device is disposed in the UE.

15. The method of claim 12, wherein the communication resource selection indication information further comprises at least one of the following information:
- a triggering condition corresponding to the selection manner; or
- a condition for stopping selecting the communication resource in the selection manner.

* * * * *